(12) United States Patent
Jo

(10) Patent No.: US 12,488,818 B2
(45) Date of Patent: Dec. 2, 2025

(54) CIRCUIT FOR ALIGNING COMMAND INPUT DATA AND SEMICONDUCTER DEVICE INCLUDING THE SAME

(71) Applicant: Micron Technology, Inc., Boise, ID (US)

(72) Inventor: Youngkwon Jo, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 135 days.

(21) Appl. No.: 18/507,296

(22) Filed: Nov. 13, 2023

(65) Prior Publication Data

US 2024/0290365 A1 Aug. 29, 2024

Related U.S. Application Data

(60) Provisional application No. 63/447,800, filed on Feb. 23, 2023.

(51) Int. Cl.
*G11C 7/10* (2006.01)
*G11C 7/22* (2006.01)

(52) U.S. Cl.
CPC ............ *G11C 7/222* (2013.01); *G11C 7/1045* (2013.01); *G11C 7/1063* (2013.01)

(58) Field of Classification Search
CPC ..... G11C 7/222; G11C 7/1045; G11C 7/1063; G11C 7/22; G11C 7/225; G11C 7/109
USPC .......................................... 365/230.06, 233.1
See application file for complete search history.

(56) References Cited

U.S. PATENT DOCUMENTS

| | | | | |
|---|---|---|---|---|
| 6,147,926 A | * | 11/2000 | Park | G11C 7/1066 365/221 |
| 6,947,883 B1 | * | 9/2005 | Gupta | G01R 31/3167 703/23 |
| 2004/0052153 A1 | * | 3/2004 | Heragu | G11C 7/22 365/233.1 |
| 2005/0286506 A1 | * | 12/2005 | LaBerge | G11C 29/02 370/363 |
| 2007/0234098 A1 | * | 10/2007 | Tousek | G06F 1/04 713/500 |
| 2009/0146716 A1 | * | 6/2009 | Ide | H03K 5/14 327/261 |
| 2013/0258783 A1 | * | 10/2013 | Chan | G11C 7/1012 365/185.18 |
| 2017/0140808 A1 | * | 5/2017 | Jung | G11C 11/4093 |
| 2019/0120901 A1 | * | 4/2019 | Chen | G01R 31/31705 |
| 2022/0083482 A1 | * | 3/2022 | Ootomo | G06F 13/1689 |
| 2023/0231546 A1 | * | 7/2023 | Kumari | H03K 5/1252 327/551 |
| 2023/0386529 A1 | * | 11/2023 | Uemura | G11C 7/109 |

\* cited by examiner

*Primary Examiner* — Michael T Tran
(74) *Attorney, Agent, or Firm* — Fletcher Yoder, P.C.

(57) ABSTRACT

Systems and methods of the present disclosure may involve a memory device that includes a command path. The command path may include a command decoder. The memory device may also include a clock path. The clock path may include a multiplexer coupled to the command path via one or more flip-flops. By including the multiplexer in the clock path, a reduced amount of processing bottleneck may occur in the command decoder.

20 Claims, 7 Drawing Sheets

CIRCUIT FOR ALIGNING COMMAND INPUT DATA AND SEMICONDUCTER DEVICE INCLUDING THE SAME

CROSS-REFERENCE TO RELATED APPLICATIONS

This application claims priority to U.S. Provisional Application No. 63/447,800, filed Feb. 23, 2023, entitled "CIRCUIT FOR ALIGNING COMMAND INPUT DATA AND SEMICONDUCTOR DEVICE INCLUDING THE SAME," the disclosure of which is incorporated by reference in its entirety for all purposes.

BACKGROUND

Field of the Present Disclosure

Embodiments of the present disclosure relate generally to memory devices. More specifically, embodiments of the present disclosure relate to command decoding circuitry of a memory device.

Description of Related Art

Generally, a computing system may include electronic devices that, in operation, communicate information via electrical signals. For example, a computing system may include a processor communicatively coupled to a memory device, such as a dynamic random-access memory (DRAM) device, a ferroelectric random-access memory (FeRAM) device, another random-access memory (RAM) device, and/or a hybrid device that incorporates more than one type of RAM. In this manner, the processor may communicate with the memory device, for example, to retrieve executable instructions, retrieve data to be processed, by the processor, and/or store data output from the processor.

The memory devices use various signals, like clocks and commands, during memory operations, like read operations, write operations, and refresh operations, among other operations. Specifically, logic circuitry of the memory devices respond to the various signals generated by control circuitry to implement the memory operations. However, some portions of the logic circuitry may suffer from propagation delays. At relatively slow command frequencies, memory device operation is negligibly affected by the delays of the logic circuitry. But, since memory devices continue to increase in operating frequencies, the delays of the logic circuitry may cause a speed bottleneck to occur in the logic circuitry for the processing of memory operation commands.

Embodiments of the present disclosure may be directed to one or more of the problems set forth above.

BRIEF DESCRIPTION OF THE DRAWINGS

Various aspects of this disclosure may be better understood upon reading the following detailed description and upon reference to the drawings in which.

DETAILED DESCRIPTION

Figure 1:
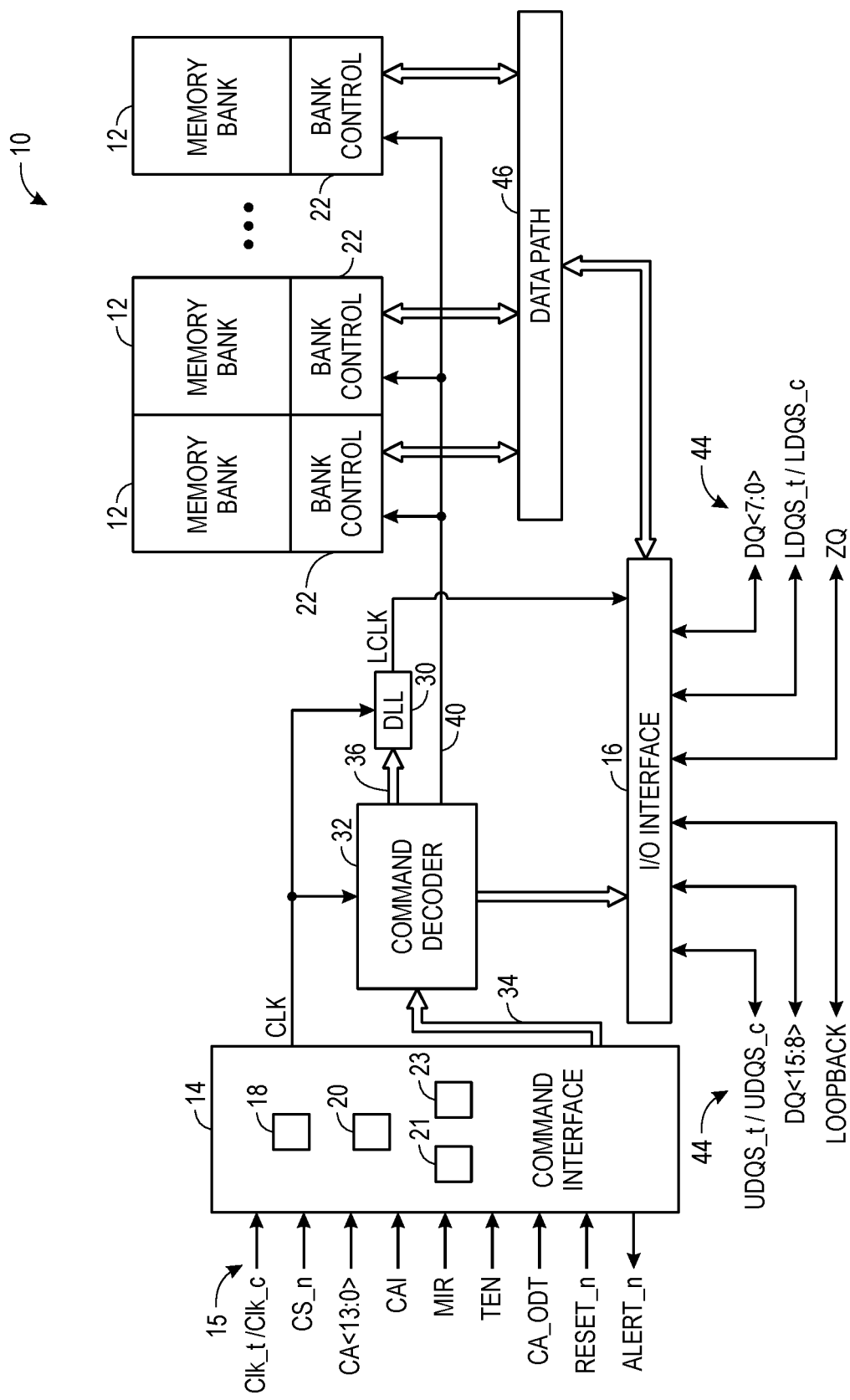
FIG. 1 is a block diagram, illustrating a memory device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

As previously discussed, a memory device uses signals to process memory commands and perform operations responsive to the memory commands. Logic circuitry disposed between input circuitry and a memory array may delay the signals while executing the memory commands. For example, multiplexing circuitry and control logic disposed after a command decoder in a command path may delay a processed memory command. A timing margin may exist between flip-flips of the control logic, for example, a margin between rising edge of an even component of the clock and an odd component of the clock may equal 1 clock pulse (1tCK). At lower operating frequencies, the timing delays may not disrupt memory device operation. However, as operating frequencies continue to increase, the clock pulse durations reduce causing the setup margin to decrease. In other words, introduced delays may remain the same but over time become wider than the setup margins of the memory device due to the shortening of the setup margins, causing a processing bottleneck. The processing bottleneck may delay processing in the command decoder upstream from the multiplexer and logic circuitry. Moreover, the processing bottleneck may cause further device misalignment, such as the memory device being operated to prematurely capture or cut off memory commands when operating at sufficiently high operating frequencies that cause the narrowing of timing margins.

To remedy these issues, multiplexing circuitry and control logic may be coupled upstream from the command decoder in the memory device to reduce the bottlenecking. A multi-clock cycle command decoder with a clock divider is described herein that includes a multiplexer in a clock path. Since the clock divider may output divided clocks to delay circuitry and the multiplexer circuitry in parallel, the divided clocks may continue to be used in the command path (e.g., as inputs to flip-flops) while the mode selection signal is received and/or other processing is performed to help reduce processing bottlenecks.

To elaborate, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a double data rate type five synchronous dynamic random access memory (DDR5 SDRAM) device. Various features of DDR5 SDRAM allow for reduced power consumption, more bandwidth and more storage capacity compared to prior generations of DDR SDRAM.

The memory device 10, may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., ×8 or ×16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabit (Gb) DDR5 SDRAM, the memory chip may include 16 memory banks 12, arranged into 8 bank groups, each bank group including 2 memory banks. For a 16 Gb DDR5 SDRAM, the memory chip may include 32 memory banks 12, arranged into 8 bank groups, each bank group including 4 memory banks, for instance. Various other configurations, organization and sizes of the memory banks 12 on the memory device 10 may be utilized depending on the application and design of the overall system.

The memory device 10 may include a command interface 14 and an input/output (I/O) interface 16. The command interface 14 is configured to provide a number of signals (e.g., signals 15) from an external device (not shown), such as a processor or controller. The processor or controller may provide various signals 15 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to ensure proper handling of the signals 15. The command interface 14 may receive one or more clock signals from an external device. Generally, double data rate (DDR) memory utilizes a differential pair of system clock signals, referred to herein as the true clock signal (Clk_t) and the complementary clock signal (Clk_c). The positive clock edge for DDR refers to the point where the rising true clock signal Clk_t crosses the falling complementary clock signal Clk_c, while the negative clock edge indicates that transition of the falling true clock signal Clk_t and the rising of the complementary clock signal Clk_c. Commands (e.g., read command, write command, etc.) are typically entered on the positive edges of the clock signal and data is transmitted or received on both the positive and negative clock edges.

The clock input circuit 18 receives the true clock signal (Clk_t) and the complementary clock signal (Clk_c) and generates an internal clock signal CLK. The internal clock signal CLK is supplied to an internal clock generator 30, such as a delay locked loop (DLL) circuit. The internal clock generator 30 generates a phase controlled internal clock signal LCLK based on the received internal clock signal CLK. The phase controlled internal clock signal LCLK is supplied to the I/O interface 16, for instance, and is used as a timing signal for determining an output timing of read data.

The internal clock signal CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the internal clock generator 30 over the bus 36 to coordinate generation of the phase controlled internal clock signal LCLK. The phase controlled internal clock signal LCLK may be used to clock data through the IO interface 16, for instance.

Further, the command decoder 32 may decode commands, such as read commands, write commands, mode-register set commands, activate commands, etc., and provide access to a particular memory bank 12 corresponding to the command, via the bus path 40. As will be appreciated, the memory device 10 may include various other decoders, such as row decoders and column decoders, to facilitate access to the memory banks 12. In one embodiment, each memory bank 12 includes a bank control block 22 which provides the necessary decoding (e.g., row decoder and column decoder), as well as other features, such as timing control and data control, to facilitate the execution of commands to and from the memory banks 12.

The memory device 10 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 14 using the clock signals (Clk_t and Clk_c). The command interface may include a command address input circuit 20 which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA<13:0> bus. For example, when the CS_n signal drops to a low state, a command address acquisition and command execution process may begin. Access to specific banks 12 within the memory device 10 is encoded on the CA<13:0> bus with the commands.

As will be discussed in detail below, multiple modes of command processing may be supported. For example, in DDR5, some commands are two-cycle commands that are acquired over two clock cycles. For such two-cycle commands, multiple acquisition modes may be available, enabling acquisition of commands over either immediately subsequent clock cycles or over two clock cycles with an intervening clock cycle between them. As used herein, successive clock cycles refer to clock cycles with no clock cycles therebetween. In both modes, a first half of the command may be sampled on the clock of the active chip select. In a first mode (e.g., 1N mode), a second half of the command may be sampled on the next clock edge. For example, in the 1N mode, a first cycle is used to acquire a first portion of the command address and in the immediately subsequent cycle (e.g., the second cycle) the remaining portion of the command address is acquired. The 1N mode is particularly useful in situations where command acquisition is predictably fast, as the command latency is reduced to two clock cycles.

In 2N mode, the second half of the command may be sampled two clocks after the first half. Indeed, in the second mode (e.g., 2N mode), one clock cycle is skipped in between receiving the first portion of the command address and receiving the second portion of the command address. The skipped cycle is provided to issue a wider window for acquisition of command address information. This is particularly useful when additional acquisition time is needed, (e.g., during device initialization processes, etc.).

A mode register 21 may be set to indicate a particular mode of operation for command acquisition. The mode register 21 may be set via a command provided to the command interface. Once set, the mode register 21 may provide an indication of the mode (e.g., either 1N or 2N mode) and implementation of the selected mode may commence. Many factors must be considered to enable the dynamically changeable acquisition modes. As discussed in detail below, the command interface 14, command decoder 32, and/or other logic/circuitry may handle acquisition and processing of the commands for these modes. Mode selection and/or implementation may be handled by hardware circuitry and/or machine-readable instructions implemented by hardware circuitry. In the embodiment illustrated in FIG. 1, mode selection and implementation circuitry 23 of the command address input circuit 20 may handle implementation details of the various modes.

In addition, the command interface 14 may be configured to receive a number of other command signals. For instance, a command/address on die termination (CA_ODT) signal may be provided to facilitate proper impedance matching within the memory device 10. A reset command (RESET_n) may be used to reset the command interface 14, status registers, state machines and the like, during power-up for instance. The command interface 14 may also receive a command/address invert (CAI) signal which may be provided to invert the state of command/address signals CA<13:0> on the command/address bus, for instance, depending on the command/address routing for the particular memory device 10. A mirror (MIR) signal may also be provided to facilitate a mirror function. The MIR signal may be used to multiplex signals so that they can be swapped for enabling certain routing of signals to the memory device 10, based on the configuration of multiple memory devices in a particular application. Various signals to facilitate testing of the memory device 10, such as the test enable (TEN) signal, may be provided, as well. For instance, the TEN signal may be used to place the memory device 10 into a test mode for connectivity testing.

The command interface 14 may also be used to provide an alert signal (ALERT_n) to the system processor or controller for certain errors that may be detected. For instance, an alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during certain operations, such as the connectivity test mode executed using the TEN signal, as described above.

Data may be sent to and from the memory device 10, utilizing the command and clocking signals discussed above, by transmitting and receiving data signals 44 through the IO interface 16. More specifically, the data may be sent to or retrieved from the memory banks 12 over the datapath 46, which includes a plurality of bi-directional data buses. Data IO signals, generally referred to as DQ signals, are generally transmitted and received in one or more bi-directional data busses. For certain memory devices, such as a DDR5 SDRAM memory device, the IO signals may be divided into upper and lower bytes. For instance, for a ×16 memory device, the IO signals may be divided into upper and lower IO signals (e.g., DQ<15:8> and DQ<7:0>) corresponding to upper and lower bytes of the data signals, for instance.

To allow for higher data rates within the memory device 10, certain memory devices, such as DDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals are used as clock signals to capture the corresponding input data. As with the clock signals (Clk_t and Clk_c), the data strobe (DQS) signals may be provided as a differential pair of data strobe signals (DQS_t and DQS_c) to provide differential pair signaling during reads and writes. For certain memory devices, such as a DDR5 SDRAM memory device, the differential pairs of DQS signals may be divided into upper and lower data strobe signals (e.g., UDQS_t and UDQS_c; LDQS_t and LDQS_c) corresponding to upper and lower bytes of data sent to and from the memory device 10, for instance.

An impedance (ZQ) calibration signal may also be provided to the memory device 10 through the IO interface 16. The ZQ calibration signal may be provided to a reference pin and used to tune output drivers and ODT values by adjusting pull-up and pull-down resistors of the memory device 10 across changes in process, voltage and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/

VSS external to the memory device 10. This resistor acts as a reference for adjusting internal ODT and drive strength of the IO pins.

In addition, a loopback signal (LOOPBACK) may be provided to the memory device 10 through the IO interface 16. The loopback signal may be used during a test or debugging phase to set the memory device 10 into a mode wherein signals are looped back through the memory device 10 through the same pin. For instance, the loopback signal may be used to set the memory device 10 to test the data output (DQ) of the memory device 10. Loopback may include both a data and a strobe or possibly just a data pin. This is generally intended to be used to monitor the data captured by the memory device 10 at the IO interface 16.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory device 10. Accordingly, it should be understood that the block diagram of FIG. 1 is only provided to highlight certain functional features of the memory device 10 to aid in the subsequent detailed description.

As mentioned above, the command acquisition and implementation may be performed using one of a set of modes of acquisition. The discussion now turns to particular modes that may be used and particular implementations of acquiring and/or executing the commands under these modes.

1N Mode

Figure 2:
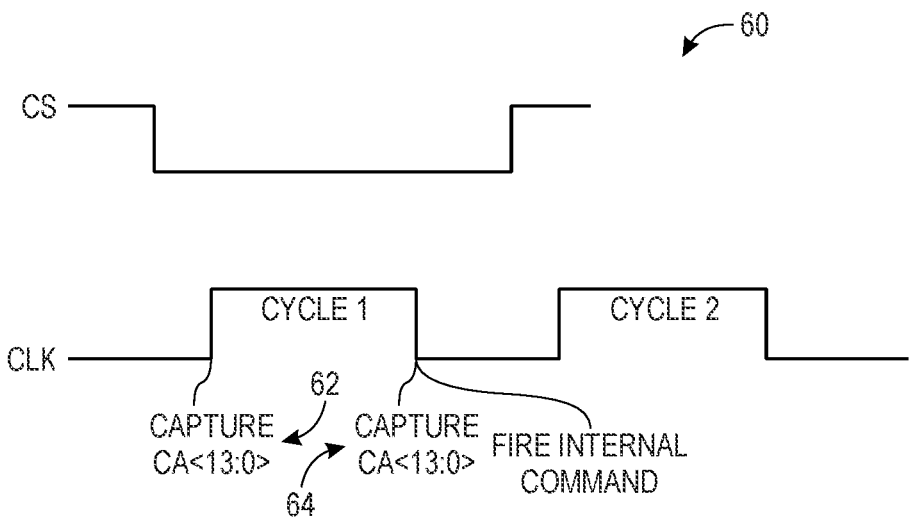
FIG. 2 illustrates a timing diagram for capture and execution of command information in 1N mode, in accordance with an embodiment.

The discussion begins with 1N mode. In 1N mode, command address information is obtained via two immediately succeeding cycles. The 1N mode may be useful to reduce command execution latency, when a narrow command address capture window may be used. FIG. 2 illustrates a timing diagram 60 for capture and execution of command information in 1N mode, in accordance with an embodiment.

In 1N mode, the chip select signal (CS) dropping to low provides an indication of the first cycle "Cycle1" for obtaining command data (e.g., by indicating a first command address capture). In other words, the CS dropping to low triggers generation of a pair of clocks used to capture respective portions of a command address (e.g., first CA portion CA<13:0>62 and second CA portion CA<13:0>64). The first clock is generated from the first cycle "Cycle1" after the CS drop to low, resulting in capture of the first command address portion. The second clock is generated from the subsequent cycle "Cycle2", resulting in the capture of the second command address portion. The information obtained from the first and second command address captures are used together to fire an internal command, as illustrated.

2N Mode

Figure 3:
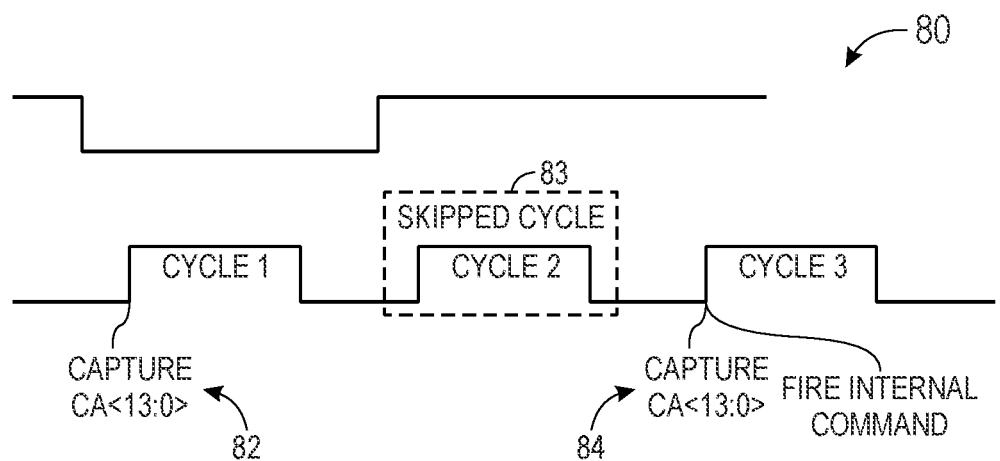
FIG. 3 illustrates a timing diagram for capture and execution of command information in 2N mode, in accordance with an embodiment.

In 2N mode, command address information is obtained via two cycles with an intermediately skipped cycle. As discussed above, the 2N mode provides a wider command address capture window, which may be useful in some scenarios (e.g., during calibration, etc.). FIG. 3 illustrates a timing diagram 80 for capture and execution of command information in 2N mode, in accordance with an embodiment.

Similar to the 1N mode, in 2N mode, the chip select signal (CS) dropping to low indicates the first cycle "Cycle1" of the command. The first clock is generated from "Cycle1", resulting in the first command address capture 82. However, in 2N mode, the second cycle "Cycle2" is skipped, as the 2N mode skips one cycle after the first cycle of the command. This is illustrated by block 83. The skipped cycle provides a wider window, enabling more time for command address information processing. Accordingly, in 2N mode, the third clock is generated from "Cycle3," triggering the second capture 84 of the command address. The information obtained from the first and second command address captures are used together to fire an internal command, as illustrated.

To perform the cycle-skipping functionality of 2N mode, 2N mode logic may be used to ensure that command/address information is not captured from the external pins during the second cycle "Cycle2." Further, because the second command capture occurs at "Cycle3" the internal mechanism may be tasked with ensuring that a command does not fire at "Cycle2" ("skipped cycle"), which may preserve a quality of operation by not mixing commands at capture.

With the foregoing in mind, as frequencies of commands and/or signals used by memory devices 10 increase, a setup margin may decrease. The setup margin may decrease due to logic delay from propagating signals throughout the memory device 10.

Figure 4:
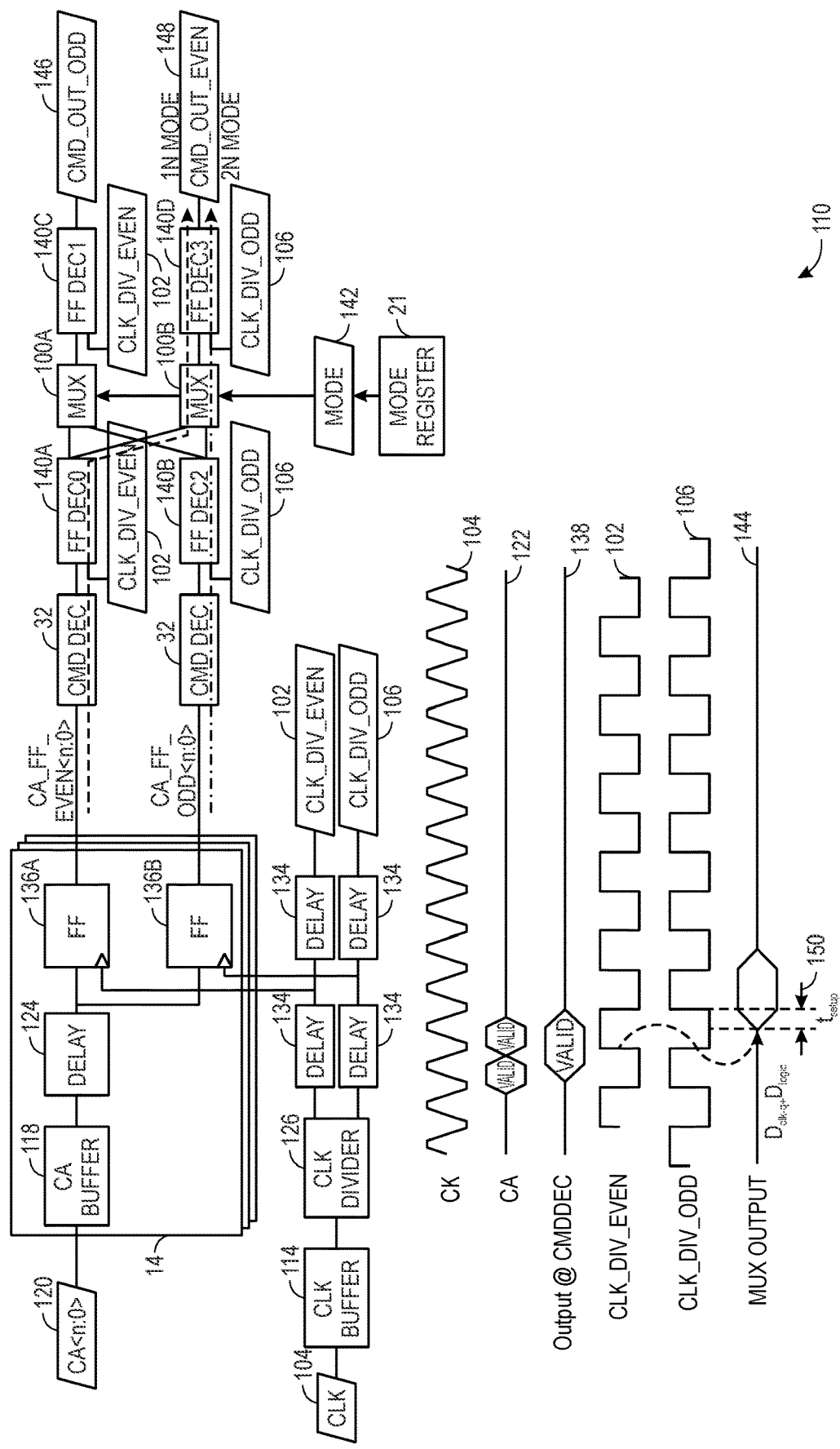
FIG. 4 is a block diagram of a portion of the memory device of FIG. 1 being operated to align with an even clock component of a system clock based on a multiplexer downstream from the command decoder of FIG. 1, in accordance with an embodiment.
Figure 5:
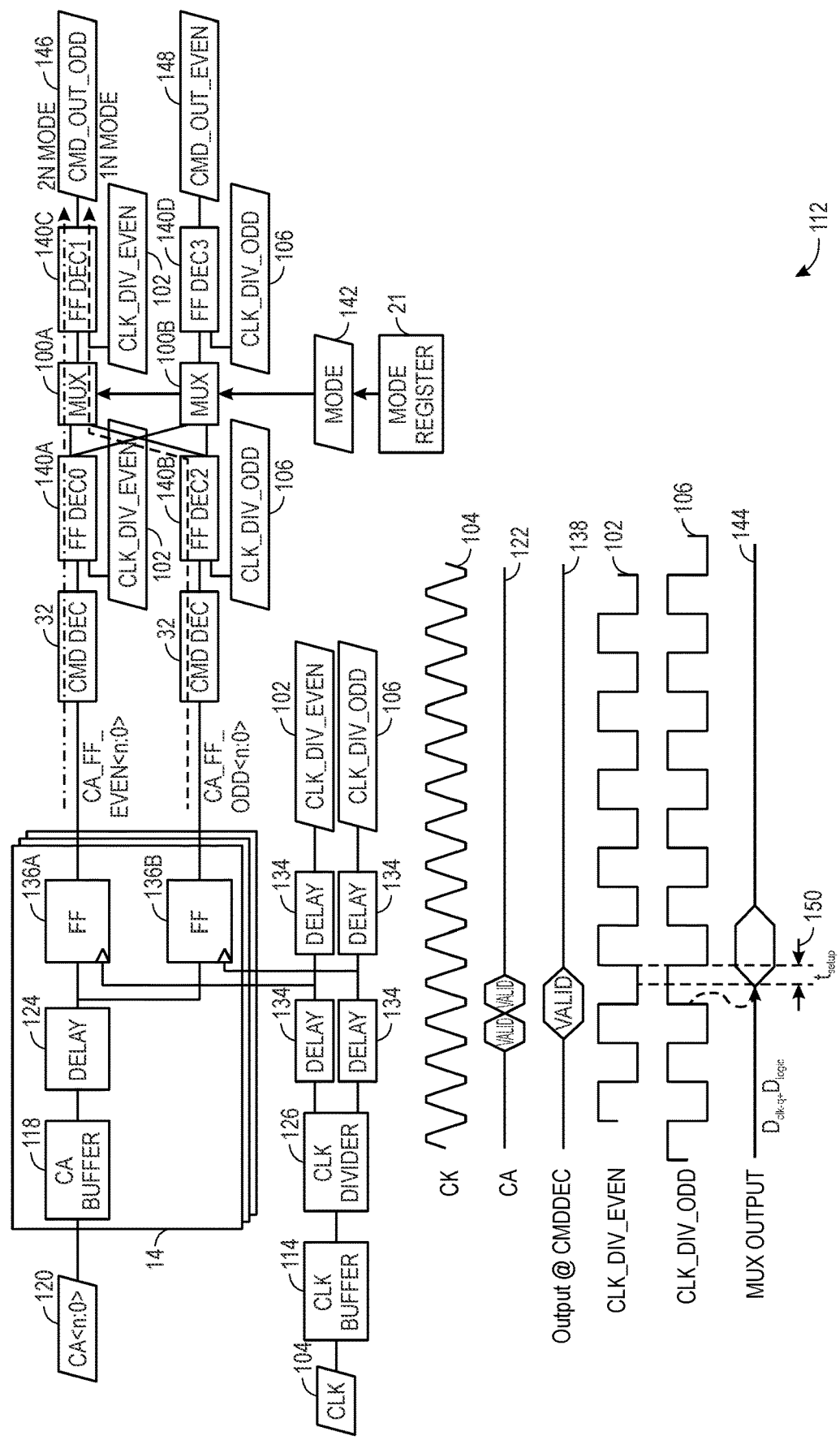
FIG. 5 is a block diagram of the portion of the memory device of FIG. 4 being operated to align with an odd clock component of the system clock based on the multiplexer of FIG. 4, in accordance with an embodiment.

FIG. 4 and FIG. 5 are block diagrams of an example of a portion of the memory device 10 that includes the command interface 14 and the command decoder 32. FIG. 4 corresponds to a memory command output from multiplexers 100 (multiplexer 100A, multiplexer 100B) being aligned with an even clock 102 component of a clock 104 while FIG. 5 corresponds to a memory command output from multiplexers 100 being aligned with an odd clock 106 component of the clock 104. FIG. 4 includes inset plot 110 and FIG. 5 includes inset plot 112. In FIG. 4, the first rising edge of the even clock 102 aligns with a start to the multiplexer 100 output (e.g., arrow 150), and, in FIG. 5, the first falling edge of the odd clock 106 aligns with start to the multiplexer 100 output (e.g., arrow 150). For ease of description, FIGS. 4 and 5 are described together.

A clock buffer 114 may receive a clock 104 ("CLK") from an input bus (not illustrated). The clock 104 may be a system clock. A command address buffer (CA buffer) 118 may receive a command address signal 120 ("CA<n:0>," where a respective of the n signals is CA corresponding to line 122) from the input bus (not illustrated). While, the command address signal 120 is received and delayed via delay circuitry 124, a clock divider 126 may receive the delayed clock 104 from the clock buffer 114 and divide the clock 104 into two signals—an even clock 102 (even clock component, "CLK_DIV_EVEN" corresponding to line "102") and an odd clock 106 (odd clock component, "CLK_DIV_ODD" corresponding to line "106"). The clock buffer 114 and delay circuitry 134 (e.g., one or more additional buffers) may be included to adjust timing of the clocks to be aligned such that the even clock 102 and/or odd clock 106 suitably causes flip-flops 136 (flip-flop 136A, flip-flop 136B) to respectively capture the delayed command transmitted from the delay circuitry 134. Once flip-flops 136 receive the even clock 102 or odd clock 106 from the delay circuitry 134, the flip-flops 136 may respectively latch a delayed command from delay circuitry 134 and generate an output ("CA_FF_EVEN," "CA_FF_ODD") to be sent to command decoder 32 (which may be split across the two command paths to be able to respectively compensate for the different timings of the odd clock 106 and the even clock 102). The command decoder 32 may decode the command address and transmit the decoded command ("Output @ CMDDEC" corresponding to line 138) to downstream flip-flops 140, such as decoder flip-flop (FF_DEC0) 140A, decoder flip-flop (FF_DEC2) 140B, and eventually decoder flip-flop (FF_DEC1) 140C and decoder flip-flop (FF_DEC3) 140D. The flip-flops 140A and 140B transmit the decoded command ("Output @ CMDDEC) to multiplexers 100 (MUX) and the multiplexers 100 transmit the decoded command ("Output @ CMDDEC") to one of the flip-flops 140C, 140D based on a mode signal 142 transmitted from the mode register 21. The even clock 102 (CLK_DIV_EVEN) is used to operate the flip-flops 140A, 140C and the odd clock 106 (CLK_DIV_ODD) is used to operate the flip-flops 140B, 140D. The multiplexers 100 are operated in response to a mode signal 142 from the mode register 21. The mode signal 142 may have a first state corresponding to a 1N mode and a second state corresponding to a 2N mode. In both FIG. 4 and FIG. 5, the mode register 21 generates and transmits the mode signal 142 having the second state corresponding to the 2N mode. From the multiplexers 100, the decoded command ("MUX OUTPUT" corresponding to line 144) is routed, in FIG. 4, through the FF_DEC3 140D and is routed, in FIG. 5, through the FF_DEC1 140C. In FIG. 4, the 1N mode signal 142 and the 2N mode signal 142 respectively cause the multiplexers 100 to route the decoded command through the FF_DEC3 140D either from FF_DEC0 140A in the 1N mode or from FF_DEC2 140B in the 2N mode. In FIG. 5, the 1N mode signal 142 and the 2N mode signal 142 both cause the multiplexers 100 to route the decoded command through the FF_DEC1 140C either from FF_DEC0 140A in the 2N mode or from FF_DEC2 140B in the 1N mode.

The decoded command eventually transmits from either the flip-flop 140C as CMD_OUT_ODD 146 or from the flip-flop 140D as CMD_OUT_EVEN 148. In both cases shown in FIG. 4, the decoded command transmits as the CMD_OUT_EVEN 148 and in both cases shown in FIG. 5, the decoded command transmits as the CMD_OUT_ODD 146.

As frequencies increase, the setup margin of FF_DEC1 140C and/or FF_DEC3 140D may decrease due to a logic delay associated with the multiplexers 100B from propagating signals throughout the memory device 10. This decrease in setup margin may be undesired since it reduces an ability of the memory device 10 to handle noise in signals and/or other system variances that affect timing alignments of signals.

To preserve and/or improve setup time even as frequencies increase, modified circuitry is proposed herein. Indeed, in the proposed command interface 14 and command decoder 32 circuitry, the multiplexers 100 and logic between otherwise consecutive flip-flops 140 are removed. This may increase a setup margin at the second flip-flop, thereby enabling a maximum operating frequency to be increased.

Figure 6:
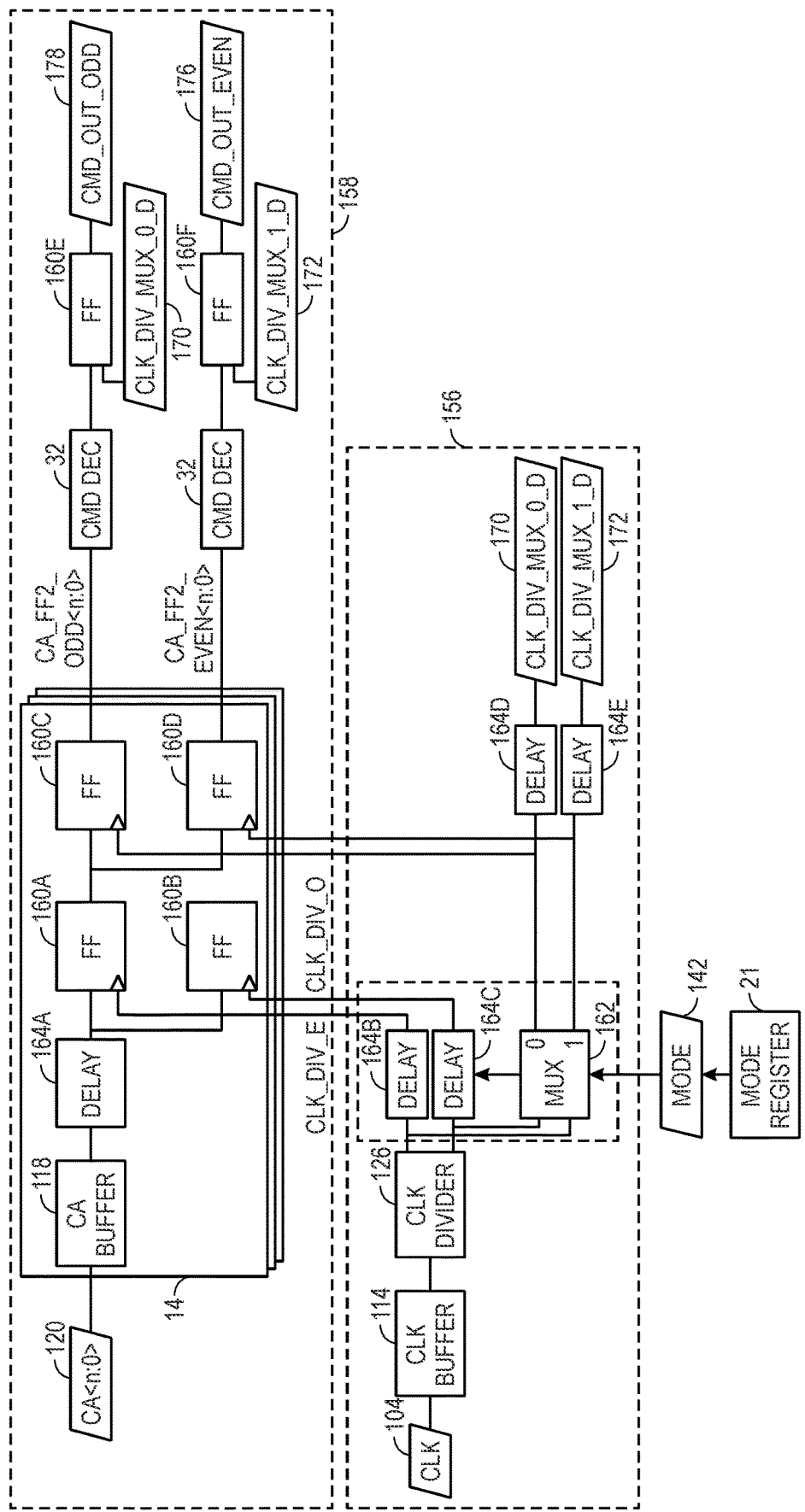
FIG. 6 is a block diagram of a portion of the memory device of FIG. 1 that includes multiplexer circuitry upstream from a command decoder, in accordance with an embodiment.

FIG. 6 is a block diagram of the command interface 14 and the command decoder 32 that includes components arranged to improve setup margins. Descriptions are relied on herein from FIGS. 1-5 for components also used in the illustrated circuitry of FIG. 6. The memory device 10, when using the command interface 14 and the command decoder 32, may use a divided clock to slice a command address input and may use consecutive flip-flops 160 (flip-flop 160A, flip-flop 160B, flip-flop 160C, flip-flop 160D) to process the sliced command address input. A multiplexer 162 may be included in a clock path 156, which may include one or more components operated at least partially simultaneously to one or more components in a command path 158. The multiplexer 162 and may be operated to output one of the divided clock components (e.g., odd clock 106, even clock 102) in response to the mode signal 142 selecting between 1N mode and 2N mode. The multiplexer 162 may be coupled to the flip-flops 160C. 160D. In this way, the multiplexer 162 may couple to respective clock inputs of one or more flip-flops 160 of multiple flip-flops 160 of the clock path 156, wherein the one or more flip-flops 160 may be respectively associated with both a first subset of flip-flops (e.g., able to operate based on the even clock 102) and the second subset of flip-flops (e.g., able to operate based on the odd clock 106). In some cases, the multiplexer 162 may generally be any selector circuit that receives multiple inputs and decides, of two or more output paths, which respective output path to use to transmit the signals.

The multiplexer 162 may be operable to receive a first clock signal provided to a first flip-flop (e.g., flip-flop 160A, flip-flop 160B), receive a mode signal 142, and transmit a first clock signal (e.g., either the even clock 102 or the odd clock 106) to the second flip-flop (the other of the flip-flops 160A, 160B) based on the mode signal 142. The flip-flops 160 may transmit a command address signal to the downstream command decoder 32 independent of each other since the flip-flops 160 respectively lie in different sub-command paths (e.g., command paths within the command path 158). Since there is no logic gate delay between the consecutive flip-flops 160, an operating frequency of the memory device 10 may be increased. Furthermore, delays introduced from transmission through the multiplexer 162 and the delay circuitry 164 (delay circuitry 164A, delay circuitry 164B, delay circuitry 164C, delay circuitry 164D, delay circuitry 164E) may be configurable to cause a timing delay equal to or substantially similar to an overall delay of the circuitry in FIGS. 4-5 since doing so may enable less complex integration with other components with the memory device 10.

To elaborate, the command buffer 118 may receive the command address signal 120 from the input bus (not illustrated). The command buffer 118 may buffer the command address signal 120 and output the command address signal 120 to delay circuitry 164A. The delay circuitry 164A may send the command address signal 120 to the flip-flop 160A and the flip-flop 160B substantially in parallel to each other.

While this occurs, a clock 104 may be received by the clock buffer 114. The clock buffer 114 may buffer the clock 104 and output the clock 104 to the clock divider 126. The clock divider 126 may separate the clock 104 into an even clock 102 component and an odd clock 106 component. The flip-flop 160A may latch the command address signal 120 in response to the even clock 102 and the flip-flop 160B may latch the command address signal 120 in response to the odd clock 106.

The multiplexer 162 may operate in response to the mode signal 142 from the mode register 21. The multiplexer 162 may be operated to output either the even clock 102 or the odd clock 106 based on a state of the mode signal 142. The various possibilities are described further in reference to FIGS. 7, 8, 9, and 10. One of two clocks 102, 106 are transmitted from the multiplexer 162 to one of the flip-flop 160C or the flip-flop 160D as well as to delay circuitry 164D, 164E in the clock path 156. The clock 104 component ("CLK_DIV_MUX_0") corresponding to a "0" or logic low mode signal 142 may be delayed and transmitted from the delay circuitry 164D as a delayed clock 170 ("CLK_DIV_MUX_0_D") to operate the flip-flop 160E in the command path 158. The clock 104 component ("CLK_DIV_MUX_1") corresponding to a "1" or logic high mode signal 142 may be delayed and transmitted from the delay circuitry 164E as a delayed clock 172

("CLK_DIV_MUX_1_D") to operate the flip-flop 160F in the command path 158. In this way, the flip-flops 160C, 160D, 160E, and 160F and the command decoder 32 may be operated based on the mode signal 142 and the delay circuitry 164D, 164E may compensate for differences in timing between the command path 158 and the clock path 156 such that a suitable rising or falling edge of the transmitted delayed clock 170, 172 may suitably operate a corresponding of the flip-flops 160E, 160F to generate a command output (either CMD_OUT_ODD 180 or CMD_OUT_EVEN 182).

Indeed, a portion of the command decoder 32 may receive the command address signal 120 from one or more of the flip-flops 160C, 160D operated to latch and output the command address signal 120. The command decoder 32 may decode the command address signal 120 and transmit a decoded command to the corresponding flip-flop of the flip-flops 160E, 160F in its command path 158. From there, the decoded command may output from that flip-flop of the flip-flops 160E, 160F as an odd output command 178 ("CMD_OUT_ODD") or an even output command 176 ("CMD_OUT_EVEN").

Figure 7:
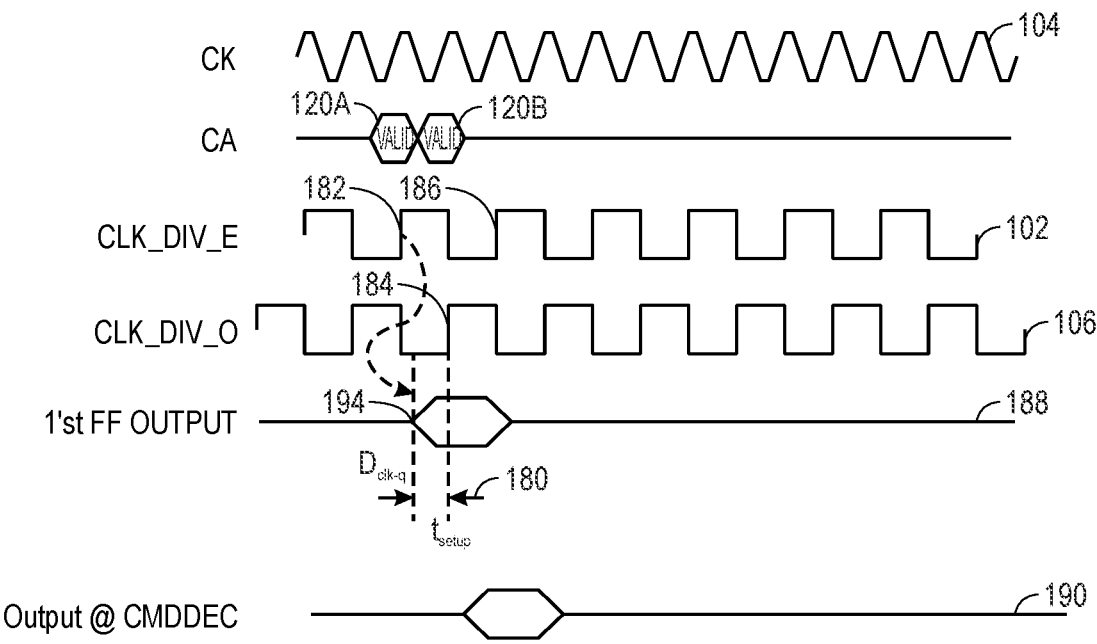
FIG. 7 is a timing diagram of signals corresponding to the portion of the memory device of FIG. 6 operated to align with an even clock component while in a 1N mode, in accordance with an embodiment.

To elaborate on specific command path 158 operations and combinations of components, FIG. 6 and FIG. 7 are described together for ease of explanation. FIG. 7 is a timing diagram illustrating alignment of the first received command address signal 120A to the rising edge of the even clock 102 and of the second command address signal 120B to the rising edge of the odd clock 106 in the 1N mode. In this example, the logic high "1" output of the multiplexer 162 corresponds to the even clock 102 from the clock divider 126 and the logic high "0" output of the multiplexer 162 corresponds to the odd clock 106. The setup time duration 180 ($t_{set\ up}$) corresponds to a duration of time between a start of an output from the flip-flop 160A (e.g., edge 182 of the even clock 102) and a subsequent edge 184 (e.g., rising edge) of the odd clock 106 operating the flip-flop 160B that secures the set-up time.

The start of the output from the flip-flop 160A occurs in response to a rising edge 182 of the even clock 102 that causes the flip-flop 160A to latch the command address signal 120A. A next rising edge 186 of the even clock 102 causes the flip-flop 160A to change its output again, ending the logical high output corresponding to the command address signal 120A (e.g., state change of line 188). When being operated in the 1N mode for the even clock, the multiplexer 162 may output according to the logical high "1" output, thereby generating clock ("CLK_DI-V_MUX_1") that is transmitted to cause the flip-flop 160C to latch the output from the flip-flop 160A. This latching aligns the output state change of the command decoder 32 ("Output @CMDDEC" of line 190) to the rising edge of the odd clock 106 ("CLK_DIV_O"). Thus, since there is no circuitry between the consecutive flip-flops 160A, 160C the setup margin is larger than in the circuitry described in FIGS. 3 and 4, which may cause the command decoder 32 to secure the set-up time without processing bottlenecking occurring and/or may enable maximum operating frequencies to increase.

Figure 8:
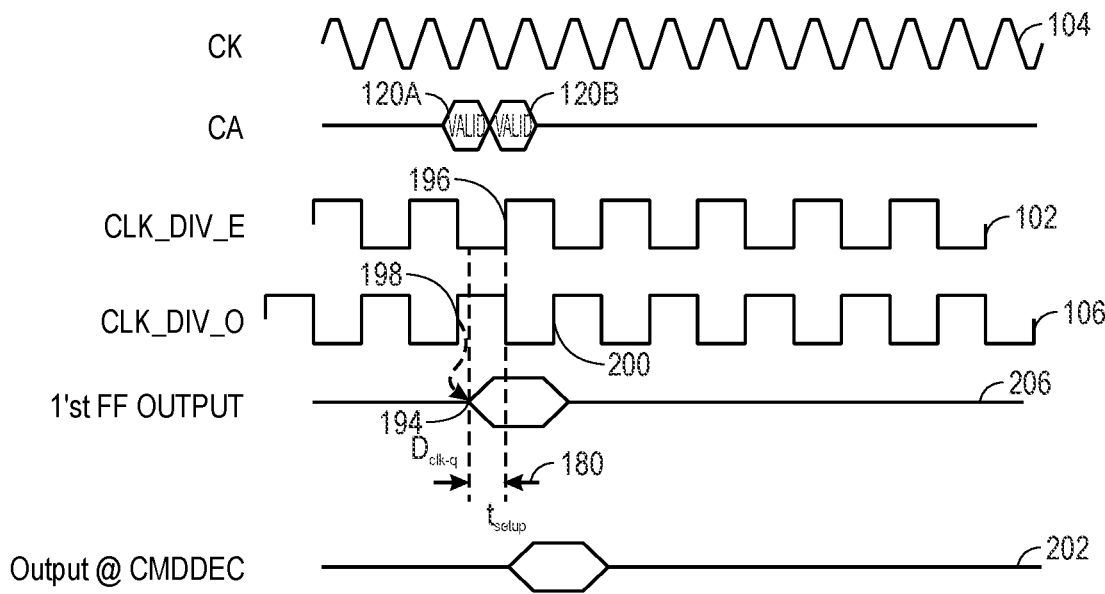
FIG. 8 is a timing diagram of signals corresponding to the portion of the memory device of FIG. 6 operated to align with an odd clock component while in a 1N mode, in accordance with an embodiment.

Similar operations may apply to the odd clock 106 in 1N mode, and FIG. 6 and FIG. 8 are described together for ease of explanation. FIG. 8 is a timing diagram illustrating alignment of the first command address signal 120A to the rising edge of the odd clock and of the second command address signal 120B to the rising edge of the even clock in the 1N mode. In this case, similar to the 1N mode even clock case of FIG. 7, the logic high "1" output of the multiplexer 162 corresponds to the even clock 102 from the clock divider 126 and the logic high "0" output of the multiplexer 162 corresponds to the odd clock 106. The setup time duration 180 ($t_{set\ up}$) corresponds to a duration of time between a start of an output from the flip-flop 160B (e.g., rising edge 198 of the odd clock 106) and a subsequent rising edge 196 of the even clock 102 operating the flip-flop 160A that secures the set up time. The start of the output from the flip-flop 160B occurs in response to a rising edge 198 of the odd clock 106 that causes the flip-flop 160B to latch the command address signal 120A. A next rising edge 200 of the odd clock 106 causes the flip-flop 160B to change its output again, ending the logical high output corresponding to the command address signal 120A (e.g., state change of signal 206). When being operated in the 1N mode for the odd clock 106, the multiplexer 162 may output according to the logical high "0" output, thereby generating clock "CLK_DIV_MUX_0" that is transmitted to cause the flip-flop 160C to latch the output from the flip-flop 160C, which aligns the output state change of the command decoder 32 ("Output @CMDDEC" of line 202) to the rising edge of the even clock 102 ("CLK_DIV_E"). Thus, since there is no circuitry between the consecutive flip-flops 160B, 160D the setup margin is larger than in the circuitry described in FIGS. 3 and 4, which may cause the command decoder 32 to secure the set-up time without processing bottlenecking occurring and/or may enable maximum operating frequencies to increase.

Figure 9:
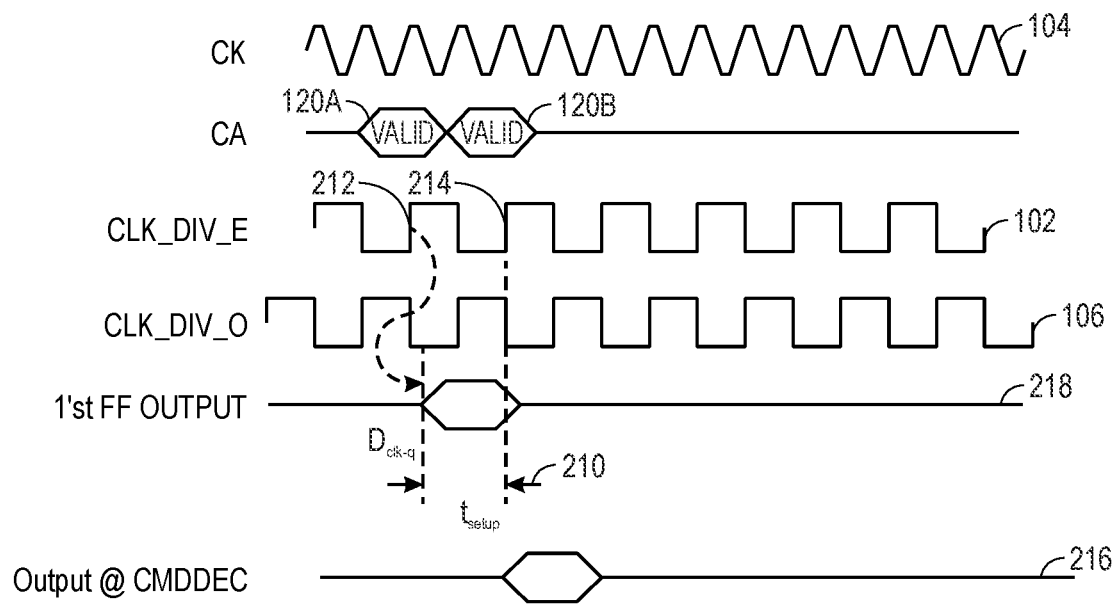
FIG. 9 is a timing diagram of signals corresponding to the portion of the memory device of FIG. 6 operated to align with an even clock component while in a 2N mode, in accordance with an embodiment.

Similar operations may apply to the even clock 102 in the 2N mode and FIG. 6 and FIG. 9 are described together for ease of explanation. FIG. 9 is a timing diagram illustrating alignment of the first command address signal 120A to the rising edge of the even clock 102 and of the second command address signal 120B to the rising edge of the odd clock 106 in the 2N mode. In this case, the logic high "0" output of the multiplexer 162 corresponds to the even clock 102 from the clock divider 126 and the logic high "1" output of the multiplexer 162 corresponds to the odd clock 106. The setup time duration 210 ($t_{set\ up}$) corresponds to a duration of time between a start of an output from the flip-flop 160A (e.g., rising edge 212 of the even clock 102) and a subsequent rising edge 214 of the even clock 102. The start of the output from the flip-flop 160A occurs in response to the rising edge 212 of the even clock 102 that causes the flip-flop 160A to latch the command address signal 120A. A next rising edge 214 of the even clock 102 causes the flip-flop 160A to change its output again based on a signal at its input, in this case ending an output corresponding to the captured command (e.g., state change of signal 218). When being operated in the 2N mode for the even clock 102, the multiplexer 162 may output according to the logical high "0" output, thereby generating clock "CLK_DIV_MUX 0." The clock "CLK_DIV_MUX_0" is transmitted to cause the flip-flop 160C to latch the output from the flip-flop 160A, which aligns the output state change of the command decoder 32 ("Output @CMDDEC" of line 216) to the rising edge of the even clock 102 ("CLK_DIV_E"). Thus, since there is no circuitry between the consecutive flip-flops 160A. 160C, the setup margin is larger than in the circuitry described in FIGS. 3 and 4, which may cause the command decoder 32 to secure the set-up time without processing bottlenecking occurring and/or may enable maximum operating frequencies to increase.

Figure 10:
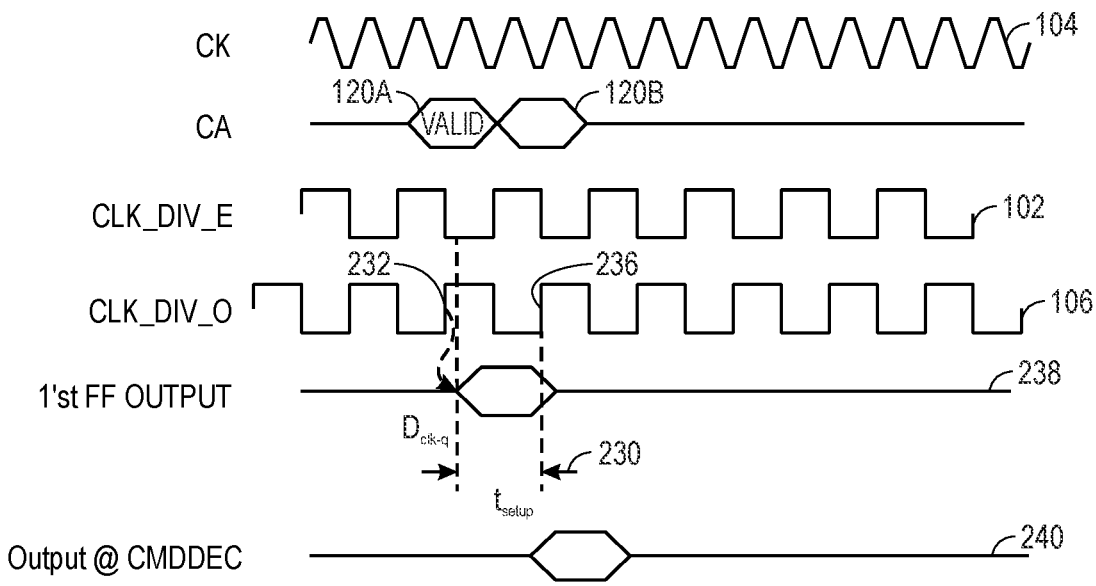
FIG. 10 is a timing diagram of signals corresponding to the portion of the memory device of FIG. 6 operated to align with an odd clock component while in a 2N mode, in accordance with an embodiment.

Similar operations may apply to the odd clock 106 in 2N mode and FIG. 6 and FIG. 10 are described together for ease of explanation. FIG. 10 is a timing diagram illustrating alignment of the first command address signal 120A to the rising edge of the odd clock 106 and of the second command address signal 120B to the rising edge of the even clock 102 in the 2N mode. In this case, the logic high "0" output of the multiplexer 162 corresponds to the even clock 102 from the clock divider 126 and the logic high "1" output of the multiplexer 126 corresponds to the odd clock 106. The setup time duration 230 ($t_{set}$ up) corresponds to a duration of time between a start of an output from the flip-flop 160A (e.g., rising edge 232 of the odd clock 106) and a subsequent rising edge 236 of the odd clock 106. The start of the output from the flip-flop 160B occurs in response to a rising edge 232 of the odd clock 106 that causes the flip-flop 160B to latch the command address signal 120B. The next rising edge 236 of the odd clock 106 causes the flip-flop 160B to change its output again, ending the logical high output corresponding to the command (e.g., state change of signal 238). When being operated in the 2N mode for the odd clock 106, the multiplexer 162 may output according to the logical high "1" output, thereby generating clock "CLK_DI-V_MUX_1." The clock "CLK_DIV_MUX_1" may be transmitted to cause the flip-flop 160D to latch the output from the flip-flop 160B, which aligns the output state change of the command decoder 32 ("Output @CMDDEC" of line 240) to the rising edge of the odd clock 106 ("CLK_DIV_O"). Thus, since there is no circuitry between the consecutive flip-flops 160B. 160D, the setup margin is larger than in the circuitry described in FIGS. 3 and 4, which may cause the command decoder 32 to secure the set-up time without processing bottlenecking occurring and/or may enable maximum operating frequencies to increase.

Technical effects caused by systems and methods of the present disclosure may include using divided clock multiplexing circuitry in a clock path as opposed to a command path. This change may increase a setup margin of a second flip-flop of consecutive flip-flops in command interface circuitry, which may enable command decoder circuitry to experience reduced or eliminated processing bottlenecks. Reducing or eliminating processing bottlenecks may further improve memory device operation by enabling memory operations to occur as requested and/or scheduled without undue delay.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A memory device, comprising:
   a command path that comprises:
      a command interface comprising a first flip-flop and a second flip-flop; and
      a command decoder coupled to the second flip-flop; and
   a clock path that comprises a multiplexer coupled to the second flip-flop and operable to:
      transmit a first clock signal to the first flip-flop at a first time;
      receive a second clock signal provided to the first flip-flop;
      receive a mode signal; and
      after the first time, transmit the second clock signal to the second flip-flop based on the mode signal.

2. The memory device of claim 1, wherein the second clock signal comprises a first clock component derived from a system clock, and wherein the second flip-flop transmits an output command independent from the first flip-flop.

3. The memory device of claim 2, comprising a clock divider configured to generate the first clock component based on the system clock.

4. The memory device of claim 3, wherein the multiplexer is configured to:
   receive a mode selection signal comprising a first state; and
   transmit the first clock component in response to the mode selection signal.

5. The memory device of claim 4, wherein the first state of the mode selection signal corresponds to the first clock component, and wherein a second state of the mode selection signal corresponds to a second clock component derived from the system clock by the clock divider.

6. The memory device of claim 1, comprising delay circuitry coupled to the first flip-flop, wherein the delay circuitry is configured to transmit the second clock signal to the first flip-flop.

7. The memory device of claim 1, wherein the command interface comprises a third flip-flop coupled to first delay circuitry, and wherein the multiplexer is operable to transmit the second clock signal, as opposed to the first clock signal, to the second flip-flop based on the mode signal.

8. The memory device of claim 7, comprising a clock divider configured to:
   receive a system clock;
   generate the first clock signal and the second clock signal based on the system clock;
   transmit the second clock signal to a second delay circuitry;
   transmit the first clock signal to the first delay circuitry; and
   transmit the first clock signal and the second clock signal to the multiplexer.

9. The memory device of claim 7, wherein the multiplexer is coupled to the second flip-flop, a fourth flip-flop of the command interface, a third delay circuitry, and a fourth delay circuitry.

10. The memory device of claim 9, wherein the multiplexer is operable to transmit the second clock signal to the second flip-flop and the third delay circuitry as opposed to the fourth flip-flop and the fourth delay circuitry.

11. The memory device of claim 10, comprising a fifth flip-flop coupled to the command decoder and to the third delay circuitry, wherein the third delay circuitry is operable to delay the second clock signal and to transmit the delayed second clock signal to the fifth flip-flop.

12. A circuit, comprising:
a command path comprising a command decoder; and
a clock path comprising a clock divider and a multiplexer coupled to the command path at respective clock inputs of a plurality of flip-flops, wherein the multiplexer is coupled between the plurality of flip-flops and an output from the clock divider, and wherein the multiplexer is operable to route different clocks of the clock path to different flip-flops of the plurality of flip-flops based on a mode signal.

13. The circuit of claim 12, wherein the clock path comprises a clock buffer, the clock divider, first delay circuitry, and the multiplexer, wherein the clock buffer is coupled to an input of the clock divider, wherein the output from the clock divider is coupled to an input of the first delay circuitry and the multiplexer.

14. The circuit of claim 12, wherein the clock path comprises a command address buffer, second delay circuitry, the plurality of flip-flops, and the command decoder, wherein the command address buffer is coupled to an input of the second delay circuitry, wherein an output of the second delay circuitry is coupled to an input of a first subset of flip-flops of the plurality of flip-flops, and wherein the command decoder is coupled to an output of a second subset of flip-flops of the plurality of flip-flops.

15. The circuit of claim 12, wherein the command path comprises a command interface comprising a first flip-flop and a second flip-flop, wherein the command decoder is coupled to the second flip-flop.

16. The circuit of claim 15, wherein the multiplexer is coupled to the second flip-flop and operable to:
receive a first clock signal provided to the first flip-flop;
receive the mode signal; and
transmit the first clock signal to the second flip-flop based on the mode signal.

17. A device, comprising:
a command path comprising a plurality of flip-flops, wherein a first subset of flip-flops of the plurality of flip-flops are respectively operable in response to a first clock signal, and wherein a second subset of flip-flops of the plurality of flip-flops are respectively operable in response to a second clock signal; and
a clock path comprising a selector circuit configured to:
transmit the first clock signal to a first flip-flop coupled to the first subset of flip-flops at a first time;
receive the second clock signal and a mode signal; and
after the first time, transmit the second clock signal to a second flip-flop coupled to the second subset of flip-flops based on the mode signal.

18. The device of claim 17, wherein the clock path comprises a command decoder coupled to the first subset of flip-flops and the second subset of flip-flops, wherein the command decoder is configured to receive a command address based on a value of the mode signal.

19. The device of claim 18, wherein the selector circuit comprises a multiplexer configured to receive the mode signal, and wherein the command address is transmitted from the first flip-flop or the second flip-flop based on the second clock signal.

20. The device of claim 17, wherein the first clock signal corresponds to an odd clock signal component when the command path is operated in a first (1N) mode, and wherein the first clock signal corresponds to an even clock signal component when the command path is operated in a second (2N) mode.

* * * * *